Feb. 3, 1970 G. M. GUERIN 3,493,676

TIME LAPSE VIDEO RECORDER

Filed Aug. 15, 1968 2 Sheets-Sheet 1

INVENTOR.
GERALD M. GUERIN

BY Hugh A. Kirk

ATTORNEY

INVENTOR.
GERALD M. GUERIN
BY
ATTORNEY

United States Patent Office
3,493,676
Patented Feb. 3, 1970

3,493,676
TIME LAPSE VIDEO RECORDER
Gerald M. Guerin, Troy, Mich., assignor to Meilink Steel Safe Company, General Television Network Inc. Division, Toledo, Ohio, a corporation of Ohio
Filed Aug. 15, 1968, Ser. No. 752,813
Int. Cl. H04n *5/76;* G11b *5/00;* H04b *1/66*
U.S. Cl. 178—6.6 12 Claims

ABSTRACT OF THE DISCLOSURE

A video tape recorder connected to a video camera and a video television tube monitor, plus (1) a circuit connected to the video tape recorder for producing square gate pulses for selecting one of a plurality of video pictures or fields in proper synchronism, for example, one frame per second, which circuit comprises delay means, pulse dividers, and multi-vibrator circuits, and (2) means for switching to drive the capstan for feeding the tape in the video tape recorder at a slower speed, whereby pictures recorded over a relatively long time interval can be compressed onto a relatively short length of video tape.

SUMMARY OF THE INVENTION

The purpose of this invention is to record many hours of picture time on a one hour reel of video tape by recording, for example, one picture per second instead of sixty per second on the tape. Such a recording system has great economic value in visually monitoring and recording what has happened in a certain place or room, such as in a bank, so as to be able to replay immediately any improper incident, such as a robbery. Instead of recording pictures one each second or each half or less fraction of a second, the device of this invention may be manually switched under emergencies to speed up its operation to record pictures at its normal speed of sixty fields or pictures per second when such is desired.

Generally speaking the present invention involves adapting a video tape recorder with its associated video camera and video monitor or television tube by (1) means to decrease the speed of the capstan motor that feeds the tape through the recording head, and (2) electronic circuit means connected to the video synchronization pulses in the recorder to select one, two or more video fields each second to control the recorder and block off recording on the tape the unselected video fields or pictures.

One manner of slowing down the capstan is to provide a slower speed motor connected by a belt through a variable tensioned idler to the shaft driven by the normal capstan motor, so that when the belt is taut, such as by operation of a solenoid, the capstan motor's drive will be cut off and the slow speed motor will be operated to drive the capstan at the slower speed for the selected pulses so as not to use up too much of the tape. The speed of the tape however is governed by selected pulses so that there is a guard band between each picture so that successive pictures will not overlap.

Tapped into the conductor in the tape recorder which carries the video synchronization pulses, is an electronic circuit through a manual disconnect switch, which switch also controls the solenoid for slowing the speed of the capstan. This electronic circuit reduces the number of sync pulses per second to the desired amount, such as by a multivibrator circuit or one of various different types of counting circuits or dividers, and then delays the pulse so selected so its leading edge corresponds exactly with the leading edge of the selected vertical sync pulse for one field of a frame or one picture scan desired to be recorded, and shapes this delay pulse so its duration is exactly the same as the time required for making the one field or picture scan. Then this shaped pulse is used as a gating pulse or an electronic switch for the amplifiers which feed the video recording head.

Objects and advantages

Accordingly it is an object of this invention to provide a simple, efficient, effective and economic electronic circuit and speed control means for video tape recorders, to select a reduced number of pictures per second for recording on the tape so as to compress a long period of monitoring time into a relative short length of a video tape.

Another object is to provide a video tape record of a monitored event or scene which record is not destroyed if the camera is destroyed, such as it if it shot out when it is recording a robbery.

BRIEF DESCRIPTION OF THE DRAWINGS

The above mentioned and other features, objects and advantages and a manner of attaining them are described more specifically below by reference to embodiments of this invention shown in the accompanying drawings, wherein.

DETAILED DESCRIPTION OF PREFERRED EMBODIMENTS

Figure 1:
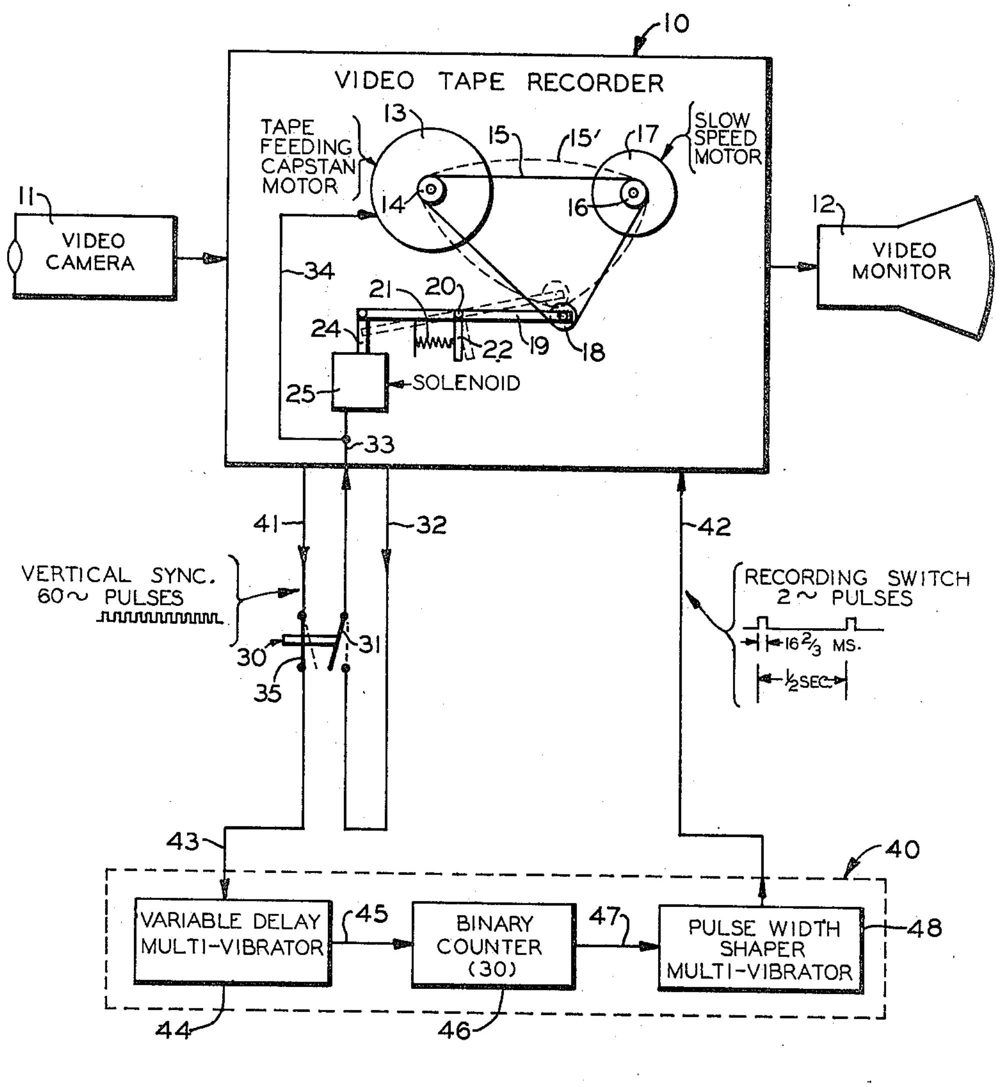
FIG. 1 is a schematic block diagram of a video tape recorder with its video camera and video monitor, and an electro-mechanical means for slowing the speed of the tape feeding capstan motor shaft, and also one embodiment of an electronic circuit for selection of two out of sixty fields per second of video pictures.
Figure 2:
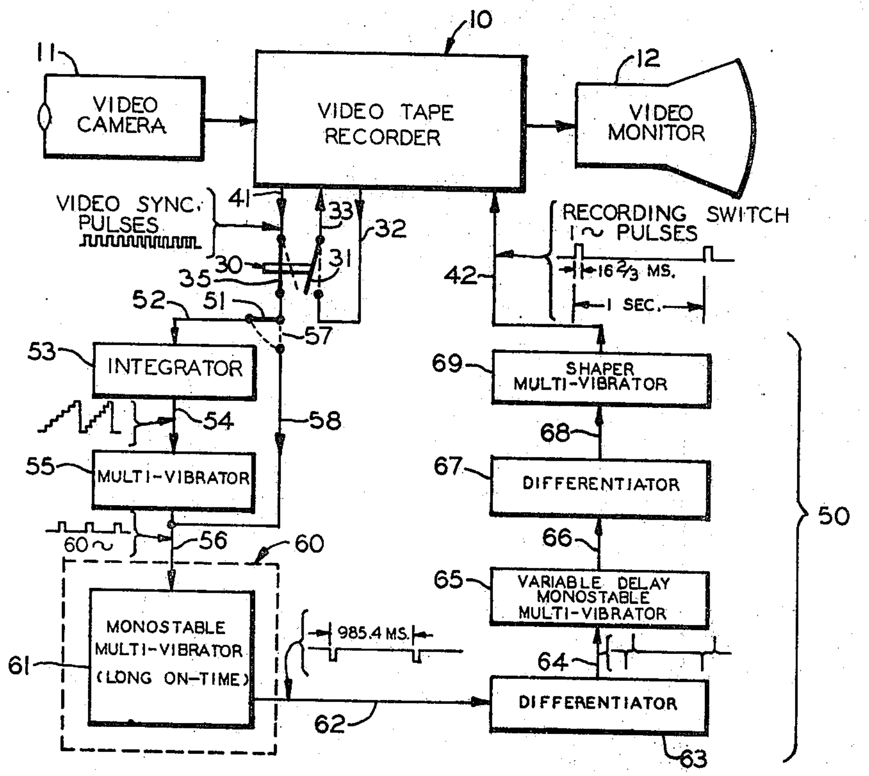
FIG. 2 is a schematic block wiring diagram of a video tape recorder camera, monitor, and slow speed tape feeder device, similar to that shown in FIG. 1, but disclosing another embodiment of an electronic circuit for the selection and forming of gating pulses for the selection and recording of one video picture per second.

Referring generally to FIGS. 1 and 2, there is schematically disclosed a video tape recorder 10 to which is connected a video camera 11 and a video monitor or television tube 12, which comprise the normal video tape recorder system. Connected to the circuit in this tape recorder 10 in both FIGS. 1 and 2, is one of the different electronic circuits 40 and 50, respectively, for selecting from the video signal synchronization pulses generated by and for the control of the video camera 11, one, two or more pulses per second and reshaping the selected pulses to produce electronic gating or switching pulses to control the recording by the video head amplifier in the recorder 10. The sync pulses selected from the control circuit in the video tape recorder 10 are withdrawn through the conductor 41 and after they are shaped they are returned as recording switch or gating pulses via the conductor 42.

(I) Capstan speed reduction device

Referring to FIG. 1, although the same mechanism is also provided in a video tape recorder 10 shown in FIG. 2, there is shown the tape feeding capstan motor 13 which feeds the tape by the recording head (not shown) in the recorder 10. On the shaft of the motor 13 there may be mounted a pulley 14 and a belt 15 which extends to a pulley 16 on the shaft of a slower speed motor 17. The belt 15 also passes around a belt tensioning idler pulley 18 which may be mounted on a lever 19 pivoted at 20 and urged into the full-line position shown by a tension spring 21 which may operate against an arm 22 rigidly attached to the lever 19. At the opposite end of the lever 19 from the idler pulley 18, there may be pivotally connected the armature 24 of a solenoid 25, which is normally de-energized through a switch 30, which may be manually operated and located outside of the control circuits of the tape recorder 10. This switch 30 has a normally open contact 31 between the conductor 32 and conductors 33 and 34 to the solenoid 25 and tape feeding capstan motor 13, respectively. This manual switch 30 also has contacts 35 in the conductor 41 to the pulse selecting and shaping circuit 40 (or 50), so that when the circuit 40 (or 50) is connected to the controller 10, the slow speed motor 17 is energized and the solenoid 25 is de-energized so that the tension spring 21 normally tensions the belt 15 into its full line position to drive the tape feeding capstan through the pulley 14 on the shaft of the motor 13. However, when the manual switch 30 is operated into its dotted line position, such as when the complete details of an event or scene are to be recorded, the slow speed motor 17 and selector and shaping circuit 40 (or 50) are de-energized and the normal fast capstan motor 13 of the video tape recorder 10 and solenoid 25 are energized, to further tension the spring 21 and loosen the belt 15 so that it rests in its dotted line motionless position 15'. Then the video tape recorder 10 records all the video pictures at the normal video speed of 30 complete frames or 60 fields per second. Thus it can be arranged, for example, in a bank video monitoring system, that when a teller is held up by a robber, the teller can press a foot switch to operate the switch 30 so that more details of the robber and robbery can be recorded.

(II) Pulse selector and shaper circuits

Referring first to the pulse selector and shaper circuit 40 shown in FIG. 1, the conductor 41 is tapped or connected to the 60 cycle per second vertical sync pulses separated from the video signal from the camera 11 in the control circuits of the video tape recorder 10. These square wave sixty cycle vertical sync pulses in conductor 41 are connected through contact 35 of switch 30 to conductor 43 to a variable delay multi-vibrator circuit 44 for delaying all these pulses so that their leading edges will correspond exactly to the start of a later field or picture scan and to allow start of the recorder at the proper time to get a complete field on the slowed down video tape. The output conductor 45 from this variable delay multi-vibrator 44 many then be connected to a binary counter circuit 46 which in this instance is shown to count up to thirty pulses, so that only one out of every thirty of the pulses fed to the input to this circuit 46 through conductor 45 is passed through its output conductor 47. This two cycle per second output in conductor 47 is then passed to a pulse width shaper multi-vibrator circuit 48, where it is widened to the time corresponding to that for scanning one field, and shaped into a square wave or gating or electronic switching pulse similar to that shown adjacent its output conductor 42. This gating pulse in conductor 42 controls the amplifiers which feed the video recording head so that it only operates and records video signals on the video tape during sixteen and two-thirds milliseconds or one sixtieth of a second each half second. This produces on the slowed down tape an energized band or area on the tape which is about 6 milliseconds wide with a guard band or area 2.7 milliseconds wide to prevent interference between it and the next adjacent energized band.

Referring now to FIG. 2, there is disclosed another type of electronic selecting and shaping circuit 50 in which all of the video sync signals for horizontal and vertical sync pulses may be selected from the control circuit of the video tape recorder 10 and passed via the conductor line 41 and contact 35 of switch 30 full-line connection 51 and conductor 52 to an integrater circuit 53 from which sixty step pulses per second are produced and passed via its output conductor 54 (see wave form adjacent the conductor 54) to a multi-vibrator circuit 55 to produce a square wave of sixty pulses per second in its output conductor 56 (see wave form adjacent the conductor 56). If only the sixty cycle square wave of the vertical sync pulses from the video signal were tapped in the video tape recorder 10 as in FIG. 1, then the conductor 41 could be connected directly to conductor 56 via the dotted line connection 57 and conductor 58.

Figures 3, 4:
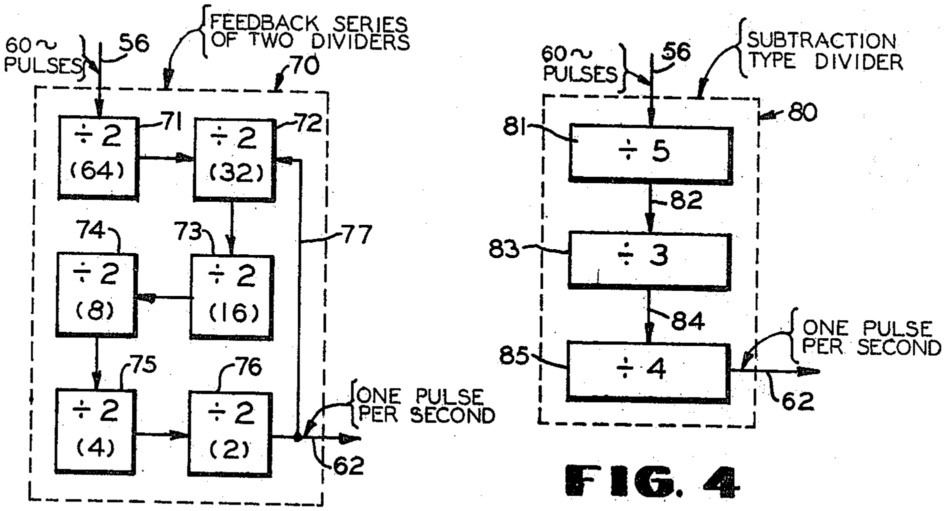
FIG. 3 is another embodiment of a block circuit diagram which may be substituted for that portion shown enclosed in dotted lines in FIG. 2 for the selection of one picture per second.
FIG. 4 is still another embodiment of a block circuit diagram which may be substituted for that portion shown enclosed in dotted lines in FIG. 2 for the selection of one picture per second.

This square wave of sixty cycle pulses in conductor 56 may then be connected to a pulse reducer selector, or divider circuit 60, 70 or 80, see the dotted rectangular circuits in FIGS. 2, 3 and 4, respectively.

In FIG. 2 the circuit 60 may comprise a monostable multi-vibrator 61 having a long on-time to produce a pulse similar to that shown in the wave form above its output conductor 62, namely a pulse having 983.4 milliseconds, or $^{59}/_{60}$ second duration for the complement of the 16.23 milliseconds or $^{1}/_{60}$ second pulse which is required for gating one field described above for the circuit of FIG. 1. The length of such a long pulse is rather hard to control exactly, nevertheless it is then differentiated in a differentiator circuit 63. The output of this differentiator 63 is passed through conductor 64 to a variable delay monostable multi-vibrator circuit 65 to synchronize the selected pulse with the start of the scanning of the video field to be recorded. This delayed pulse is passed through the conductor 66 to another differentiator circuit 67, the output 68 of which is connected to a shaper multi-vibrator 69 to produce one square pulse sixteen and two-thirds milliseconds in duration each second. This shaped pulse is then passed through the conductor 42 to control the amplifiers in the recorder 10 as an electronic switch to select the proper field to be fed to the video head for recordation on the slowed-down tape.

In FIG. 3 there is shown another type of pulse selector circuit 70, the sixty cycle input via conductor 56 is passed through a plurality of two-dividers 71, 72, 73, 74, 75 and 76 which divide the number of pulses by two six successive times, or sixty-four pulses into one pulse, but since only one pulse in sixty pulses per second is desired, a feedback conductor 77 connects the output of the last or sixth two-divider 76 back to the second two-divider 72, so that the output via conductor 62 is one pulse per second or sixty pulses per second.

In FIG. 4 there is another type of pulse selector or divider circuit 80 which may replace the circuit 60 or 70 in FIG. 2. Herein, the input conductor 56 of sixty cycle pulses is passed through a subtraction type divider comprising a five-divider 81 which divides the sixty pulses into twelve pulses per second. These twelve pulses per second are then passed via conductor 82 to a three-divider 83 which divides the twelve into four pulses per second. These four pulses per second are then passed through conductor 84 to a four-divider 85 which divides the four pulses into one, so that one pulse per second is withdrawn through the conductor 62 for feeding to the differentiator 63 in the circuit shown in FIG. 2.

Thus there are several different types of circuits which may be employed for electronically controlling or switching the recording head of a normal video tape recorder to be adapted to the video compressor system of the present invention. It is desirable, however, that this system should be primarily adapted to video tape recorders in which a single recording head is used or one in which double recording heads that are 180 degrees apart and opposite each other on the same level are used, because if the double heads are at different levels jumping of the signal monitored from the tape occurs.

While there is described above the principles of this invention in connection with specific apparatus, it is to be clearly understood that this description is made only by way of example and not as a limitation to the scope of this invention.

What is claimed is:

1. A video selective tape recorder comprising:

(a) a video camera (11) including its control circuits, (b) a tape recorder (10) including its control circuits connected to said video camera circuits, and first means (13, 14) for driving the tape at a speed corresponding to the frequency of the field synchronization pulses in said video camera control circuits, the improvement comprising:

(c) means (41) for selecting synchronization pulses from said camera control circuits, (d) means (46, 60, 70, 80) to reduce the frequency of said selected pulses to at least half, (e) means (48, 69) to form a gate pulse from each of said reduced frequency pulses, which gate pulses have a duration of one video field scan, (f) means (42) to control said tape recorder by said gate pulses whereby only those fields from said camera are recorded on the tape in said tape recorder during said gate pulses, (g) means (30) for disconnecting said first tape driving means, and (h) second means (16, 17) for driving the tape in said tape recorder at a reduced speed corresponding with the frequency of said gate pulses.

2. A recorder according to claim 1 wherein said frequency reducing means comprises a pulse divider circuit (70, 80).

3. A recorder according to claim 1 wherein said frequency reducing circuit comprises a pulse counter circuit (46).

4. A recorder according to claim 1 wherein said frequency reducing circuit comprises a multi-vibrator circuit (61).

5. A recorder according to claim 1 wherein said means to form a gate pulse comprises a multi-vibrator shaper circuit (48, 69).

6. A recorder according to claim 1 wherein said delay means comprises a variable multi-vibrator circuit (44, 65).

7. A recorder according to claim 1 wherein the synchronization pulses selected from said camera control circuits are said field synchronization pulses.

8. A recorder according to claim 1 including (i) delay means (44, 65) to insure the synchronization of the start of said gate pulses with said field synchronization pulses.

9. A recorder according to claim 1 wherein said means to reduce the frequency of said selected pulses reduces their frequency to a rate of between about one and two pulses per second.

10. A recorder according to claim 1 wherein said first and said second tape driving means comprise respectively a high speed motor and a low speed motor.

11. A recorder according to claim 10 wherein said disconnecting means comprises means for switching between said two motors.

12. A recorder according to claim 11 wherein said switch means includes means for disconnecting said pulse selecting means from said tape recorder.

References Cited

UNITED STATES PATENTS

| | | | |
|---|---|---|---|
| 3,027,425 | 3/1962 | Tannenbaum ------ | 179—15.55 |
| 3,352,968 | 11/1967 | Walter. | |
| 3,359,365 | 12/1967 | Kihara. | |
| 3,391,248 | 7/1968 | Hirota. | |

OTHER REFERENCES

Millman, J. and Taub, H., Pulse, Digital, and Switching Waveforms; New York, McGraw-Hill Book Co. © 1965, pp. 712, 716, 721–725.

ROBERT L. GRIFFIN, Primary Examiner

H. W. BRITTON, Assistant Examiner

U.S. Cl. X.R.

179—15.55, 100.2